(12) United States Patent
Cheng et al.

(10) Patent No.: US 9,703,083 B2
(45) Date of Patent: Jul. 11, 2017

(54) ZOOM LENS SYSTEM

(71) Applicant: Young Optics Inc., Hsinchu (TW)

(72) Inventors: Hung-You Cheng, Hsinchu (TW);
Yu-Hung Chou, Hsinchu (TW);
Yuan-Hung Su, Hsinchu (TW);
Wei-Hao Huang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 14/880,499

(22) Filed: Oct. 12, 2015

(65) Prior Publication Data

US 2017/0102529 A1   Apr. 13, 2017

(51) Int. Cl.
*G02B 15/14* (2006.01)
*G02B 15/177* (2006.01)
*G02B 9/60* (2006.01)
*G02B 15/16* (2006.01)
*G02B 27/00* (2006.01)
*G03B 3/00* (2006.01)
*G03B 21/00* (2006.01)

(52) U.S. Cl.
CPC ............. *G02B 15/177* (2013.01); *G02B 9/60* (2013.01); *G02B 15/161* (2013.01); *G02B 27/0018* (2013.01); *G02B 27/0025* (2013.01); *G03B 3/00* (2013.01); *G03B 21/008* (2013.01)

(58) Field of Classification Search
CPC .... G02B 15/161; G02B 13/009; G02B 15/14; G02B 15/177

USPC ................................. 359/676, 683, 691, 717
See application file for complete search history.

(56) References Cited

U.S. PATENT DOCUMENTS

| 6,985,302 | B2 | 1/2006 | Nishida |
| 7,450,320 | B2 | 11/2008 | Kang et al. |
| 7,800,835 | B2* | 9/2010 | Izuhara ............... G02B 15/177 359/691 |
| 7,944,620 | B2 | 5/2011 | Wang et al. |
| 2013/0162884 | A1* | 6/2013 | Tashiro .................. G02B 15/14 348/345 |
| 2013/0215519 | A1 | 8/2013 | Inoue |
| 2014/0063612 | A1 | 3/2014 | Kubota |

FOREIGN PATENT DOCUMENTS

CN            102789045 A    11/2012

* cited by examiner

*Primary Examiner* — William Choi
(74) *Attorney, Agent, or Firm* — Muncy, Geissler, Olds & Lowe, P.C.

(57) ABSTRACT

A zoom lens system includes a first lens group of negative refractive power and a second lens group of positive refractive power. The first lens group includes a first lens of negative refractive power, and the second lens group is disposed between the first lens group and a reduced side and includes in order from a magnified side to the reduced side a second lens of positive refractive power, a third lens of positive refractive power, a fourth lens of negative refractive power, and a fifth lens of positive refractive power. At least one of the first lens to the fifth lens is an aspherical lens having at least one aspherical surface.

19 Claims, 6 Drawing Sheets

ZOOM LENS SYSTEM

BACKGROUND

Field of the Invention

The invention relates generally to an optical lens system and, more particularly, to a zoom lens system having multiple lenses.

Description of the Related Art

Nowadays, a projection display device using a variable focus lens (zoom lens), which is capable of changing the size of an image projected onto a screen, has come into widespread use. Typically, the variable focus lens may include a large number of lenses to achieve high aberration correction, ensure telecentricity, and prevent a reduction in contrast or the occurrence of color unevenness. However, an increase in the number of lenses is accompanied by an increase in the fabrication costs. Therefore, it is desirable to provide a zoom lens system that has a reduced number of lenses and is favorable for improving imaging quality.

BRIEF SUMMARY OF THE INVENTION

According to one aspect of the present disclosure, a zoom lens system includes a first lens group of negative refractive power and a second lens group of positive refractive power. The first lens group includes a first lens of negative refractive power, and the second lens group is disposed between the first lens group and a reduced side and includes in order from a magnified side to the reduced side a second lens of positive refractive power, a third lens of positive refractive power, a fourth lens of negative refractive power, and a fifth lens of positive refractive power. At least one of the first lens, the second lens, the third lens, the fourth lens and the fifth lens is an aspherical lens having at least one aspherical surface.

According to another aspect of the present disclosure, a zoom lens system includes a first lens group of negative refractive power and a second lens group of positive refractive power. The first lens group includes a first lens of negative refractive power, and the second lens group is disposed adjacent to the first lens group and includes a second lens, a third lens, a fourth lens and a fifth lens. At least one of the first lens, the second lens, the third lens, the fourth lens and the fifth lens is an aspherical lens having at least one aspherical surface, and the conditions:

Exp<−33 mm; and

Bf>23 mm are satisfied, where Exp denotes an exit pupil position with respect to a reduced-side paraxial image plane and Bf denotes a back focal length measured from a reduced-side surface of the fifth lens to the reduced-side paraxial image plane.

According to another aspect of the present disclosure, a zoom lens system includes a first lens group of negative refractive power and a second lens group of positive refractive power. The first lens group includes a first lens of negative refractive power, and the second lens group is disposed between the first lens group and a reduced side and comprising in order from a magnified side to the reduced side a second lens with refractive power, a third lens with refractive power, a fourth lens with refractive power, and a fifth lens with refractive power. A total number of the lenses in the zoom lens system is five, the fifth lens is an aspherical lens having at least one aspherical surface, and the condition:

Exp<−33 mm is satisfied, where Exp denotes an exit pupil position with respect to a reduced-side paraxial image plane.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 1A shows outlines of lenses in the telephoto mode of operation and FIG. 1B shows outlines of lenses in the wide angle mode of operation.

FIG. 2 illustrates modulation transfer function (MTF) curves, FIG. 3 illustrates astigmatic field curves, FIG. 4 illustrates percentage distortion curves, FIG. 5 illustrates lateral color curves, and FIG. 6 illustrates transverse ray fan plots.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B"

component. Accordingly, the drawings and descriptions will be regarded as illustrative in nature and not as restrictive.

Figure 1A:
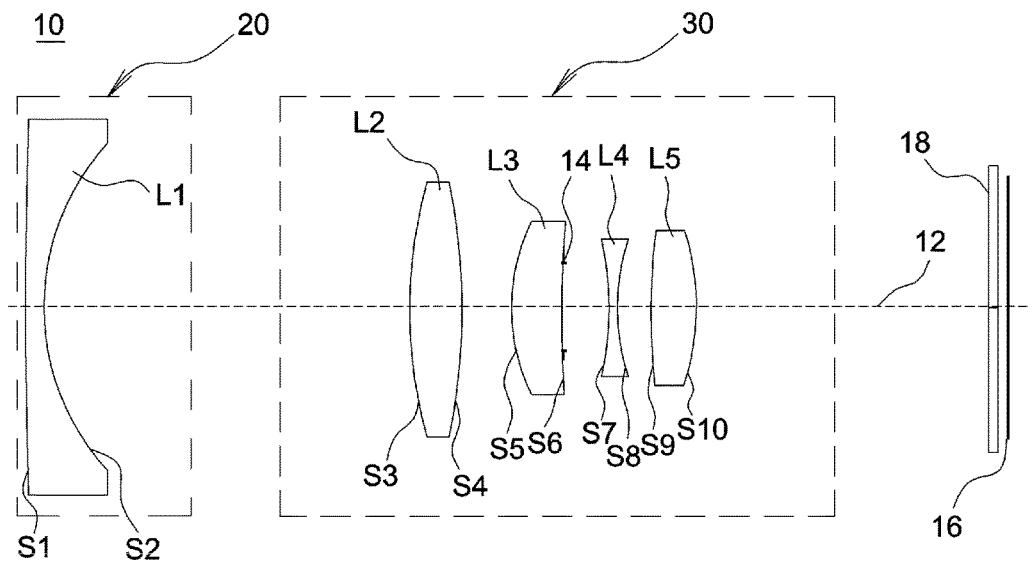
FIG. 1A and FIG. 1B show schematic diagrams of a zoom lens system according to an embodiment of the invention, where
Figure 1B:
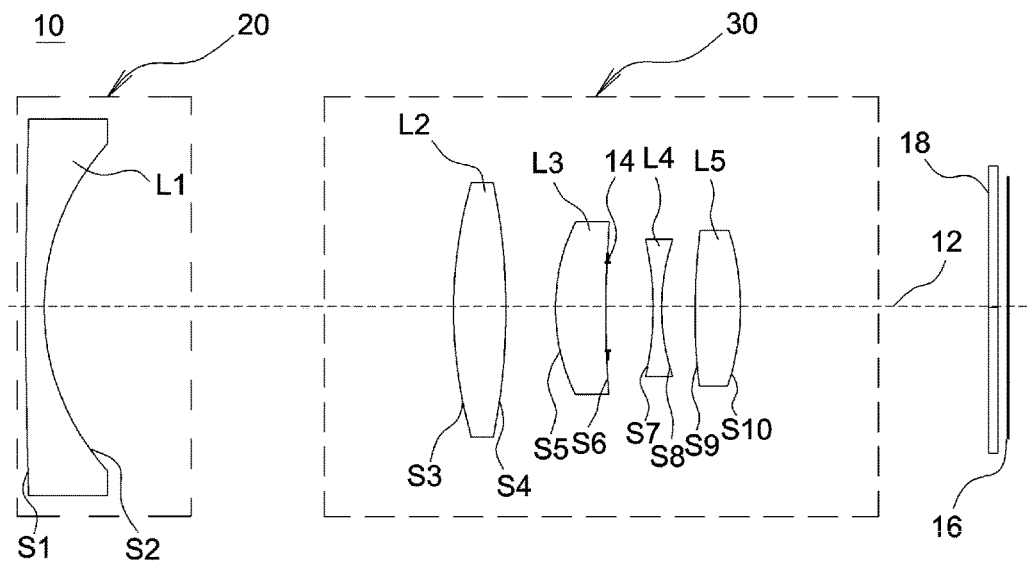

FIG. 1A and FIG. 1B show schematic diagrams of a zoom lens system according to an embodiment of the invention, where FIG. 1A shows outlines of lenses in the telephoto mode of operation and FIG. 1B shows outlines of lenses in the wide angle mode of operation. As illustrated in FIG. 1A and FIG. 1B, the zoom lens system 10 may include a first lens group 20 of negative refractive power and a second lens group 30 of positive refractive power. The first lens group 20 may be movable in a direction of an optical axis 12 for focus adjustment, and the second lens group 30 may be movable in the direction of the optical axis 12 for zooming. In one embodiment, the second lens group 30 may be first moved to effect a zooming operation, and then the first lens group 20 is moved towards its in-focus position. A spatial light modulator 16, such as a digital micro-mirror device (DMD), may selectively reflect illumination light to produce image light. In one embodiment, the image light may pass through a cover plate 18, the second lens group 30, and the first lens group 20 in succession, and then the image light may be projected onto an object (not shown).

In one embodiment, each of the lenses in the zoom lens system 10 may be made of glass. When the lens is made of glass, the distribution of the refractive power of the zoom lens system may be more flexible to design, and the glass material is not sensitive to temperature variations to ensure competent resolution of the zoom lens system under different ambient temperatures. In one embodiment, the zoom lens system 10 may include at least one aspherical lens having at least one aspherical surface favorable for correcting different kinds of optical aberrations and reducing the size of light spots rendered on a reduced-side paraxial image plane to enhance image quality. The aspherical lens of the zoom lens system 10 may be a glass mold lens or a plastic lens.

According to the above arrangements, the zoom lens system 10 having at least one aspherical lens may obtain a reduced number of required lenses as well as more controllable variables. For example, the above arrangements may permit a broader range of a back focal length and an exit pupil position to fit different kinds of optical engines.

The zoom lens system according to one embodiment may satisfy the following condition:

Bf>23 mm, where Bf denotes a back focal length of the zoom lens system measured from a reduced-side surface of the lens nearest a reduced-side paraxial image plane to the reduced-side paraxial image plane. For example, the reduced-side paraxial image plane may be provided on a light-receiving surface of a digital micro-mirror device (DMD).

The zoom lens system according to one embodiment may satisfy the following condition:

Exp<−33 mm, where Exp denotes an exit pupil position with respect to a reduced-side paraxial image plane. That is, the exit pupil position is measured from the reduced-side paraxial image plane to a paraxial exit pupil.

A design example of the zoom lens system 10 is described in detail below with reference to FIG. 1A and FIG. 1B. As illustrated in FIGS. 1A and 1B, the first lens group 20 may include a lens L1 of negative refractive power. The second lens group 30 may include four lenses L2, L3, L4 and L5 arranged in order, along an optical axis 12, from a magnified side (on the left of FIGS. 1A and 1B) to a reduced side (on the right of FIGS. 1A and 1B). The refractive powers of the lens L2, L3, L4 and L5 are positive, positive, negative and positive, respectively. In one embodiment, an Abbe number of the lens L4 is in the range of 20-50. An aperture stop 14 is located between the lens L3 and the lens L4. The lens L1 has a convex magnified-side surface S1 and a concave reduced-side surface S2, the lens L2 has a convex magnified-side surface S3 and a convex reduced-side surface S4, the lens L3 has a convex magnified-side surface S5 and a concave reduced-side surface S6, the lens L4 has a concave magnified-side surface S7 and a concave reduced-side surface S8, and the lens L5 has a convex magnified-side surface S9 and a convex reduced-side surface S10.

According to the zoom lens system of the present disclosure, each of a magnified-side and a reduced-side surface of a lens has a paraxial region and a peripheral region. The paraxial region refers to the region of the surface where light rays travel close to an optical axis and the peripheral region refers to the region of the surface where light rays travel away from the optical axis. Particularly, when a lens has a convex surface, it may indicate that the surface is convex at the paraxial region; and when the lens has a concave surface, it may indicate that the surface is concave at the paraxial region.

The detailed optical data of the first example are shown in Table 1 below.

TABLE 1

| Surface | radius (mm) | thickness (mm) | refractive index | Abbe number |
|---|---|---|---|---|
| S1 (lens L1) | 238.6 | 1.50 | 1.52 | 64.1 |
| S2 (lens L1) | 21.4 | Wide: 35.70 | | |
| | | Tele: 30.81 | | |
| S3 (lens L2) | 39.8 | 4.30 | 1.62 | 63.3 |
| S4 (lens L2) | −59.0 | 3.78 | | |
| S5 (lens L3) | 16.7 | 4.55 | 1.60 | 60.6 |
| S6 (stop) | 284.6 | 3.65 | | |
| S7 (lens L4) | −25.0 | 0.60 | 1.72 | 29.5 |
| S8 (lens L4) | 17.5 | 2.87 | | |
| S9 (lens L5) | 172.3 | 3.85 | 1.58 | 59.2 |
| S10 (lens L5) | −16.5 | Wide: 22.35 | | |
| | | Tele: 23.72 | | |

Further, the aspherical surface satisfies the following equation:

$$x = \frac{c'y^2}{1+\sqrt{1-(1+k)c'^2 y^2}} + Ay^4 + By^6 + Cy^8 + Dy^{10} + Ey^{12} + Fy^{14} + Gy^{16} \ldots,$$

where x denotes a displacement from the vertex of a lens in the direction of the optical axis 12, c' denotes a reciprocal of the radius of curvature at the vertex of a lens (approaching the optical axis 12), k denotes a Conic constant, y denotes a height (distance in the direction perpendicular to the optical axis 12) of the aspherical surface, and A, B, C, D, E, F, G, H, I, J and K are aspherical coefficients. The values of aspherical coefficients and Conic constant of the surfaces S9 and S10 of the lens L5 are listed in Table 2. In one embodiment, an effective focal length of the aspherical fifth lens may be larger than 20 mm. Note, though in this example the lens L5 is an aspherical lens, any one of the lenses of the zoom lens system 10 may be selected as the aspherical lens.

TABLE 2

| | Lens surface | |
|---|---|---|
| | S9 | S10 |
| Conic constant | 0.00E+00 | 0.00E+00 |
| A | 0.00E+00 | 0.00E+00 |
| B | 0.00E+00 | 0.00E+00 |
| C | 0.00E+00 | 0.00E+00 |
| D | 9.90E−05 | 8.51E−05 |
| E | 0.00E+00 | 0.00E+00 |
| F | 7.56E−07 | 1.86E−06 |
| G | 0.00E+00 | 0.00E+00 |
| H | 4.20E−08 | −1.52E−08 |
| I | 0.00E+00 | 0.00E+00 |
| J | −1.52E−10 | 7.25E−10 |
| K | 0.00E+00 | 0.00E+00 |
| L | 0.00E+00 | 0.00E+00 |
| M | 0.00E+00 | 0.00E+00 |
| N | 0.00E+00 | 0.00E+00 |

The detailed optical data and design parameters of a second example are shown in Table 3 and Table 4 below.

TABLE 3

| surface | radius (mm) | thickness (mm) | refractive index | Abbe number |
|---|---|---|---|---|
| S1 (lens L1) | 298.61 | 1.50 | 1.52 | 64.1 |
| S2 (lens L1) | 21.92 | wide: 33.00 Tele: 28.26 | | |
| S3 (lens L2) | 46.27 | 6.90 | 1.62 | 63.3 |
| S4 (lens L2) | −48.23 | 3.30 | | |
| S5 (lens L3) | 15.57 | 8.19 | 1.6 | 60.6 |
| S6 (stop) | 40.30 | 1.94 | | |
| S7 (lens L4) | −26.69 | 0.92 | 1.7 | 30.1 |
| S8 (lens L4) | 14.11 | 1.40 | | |
| S9 (lens L5) | 27.01 | 4.86 | 1.58 | 59.2 |
| S10 (lens L5) | −17.73 | Wide: 20.66 Tele: 21.96 | | |

TABLE 4

| | Lens surface | |
|---|---|---|
| | S9 | S10 |
| Conic constant | 0.00E+00 | 0.00E+00 |
| A | 0.00E+00 | 0.00E+00 |
| B | 0.00E+00 | 0.00E+00 |
| C | 0.00E+00 | 0.00E+00 |
| D | 9.05E−05 | 6.88E−05 |
| E | 0.00E+00 | 0.00E+00 |
| F | 8.95E−07 | 1.77E−06 |
| G | 0.00E+00 | 0.00E+00 |
| H | 2.33E−08 | −2.27E−08 |
| I | 0.00E+00 | 0.00E+00 |
| J | −2.26E−11 | 7.50E−10 |
| K | 0.00E+00 | 0.00E+00 |
| L | 0.00E+00 | 0.00E+00 |
| M | 0.00E+00 | 0.00E+00 |
| N | 0.00E+00 | 0.00E+00 |

The detailed optical data and design parameters of a third example are shown in Table 5 and Table 6 below.

TABLE 5

| surface | radius (mm) | thickness (mm) | refractive index | Abbe number |
|---|---|---|---|---|
| S1 (lens L1) | 259.76 | 1.40 | 1.52 | 64.1 |
| S2 (lens L1) | 22.79 | wide: 32.05 Tele: 26.85 | | |
| S3 (lens L2) | 64.29 | 8.00 | 1.62 | 63.3 |
| S4 (lens L2) | −44.53 | 0.40 | | |
| S5 (lens L3) | 17.28 | 8.00 | 1.72 | 60.2 |
| S6 (lens L3) | 54.65 | 2.36 | | |
| S7 (stop) | Infinity | 0.40 | | |
| S8 (lens L4) | −44.84 | 1.20 | 1.81 | 25.4 |
| S9 (lens L4) | 15.85 | 1.33 | | |
| S10 (lens L5) | −128.91 | 5.81 | 1.58 | 59.2 |
| S11 (lens L5) | −12.10 | Wide: 21.14 Tele: 22.41 | | |

TABLE 6

| | Lens surface | |
|---|---|---|
| | S9 | S10 |
| Conic constant | 0.00E+00 | 0.00E+00 |
| A | 0.00E+00 | 0.00E+00 |
| B | 0.00E+00 | 0.00E+00 |
| C | 0.00E+00 | 0.00E+00 |
| D | −1.42E−04 | −2.81E−05 |
| E | 0.00E+00 | 0.00E+00 |
| F | −1.67E−06 | −1.26E−06 |
| G | 0.00E+00 | 0.00E+00 |
| H | 4.70E−09 | 1.58E−08 |
| I | 0.00E+00 | 0.00E+00 |
| J | −8.35E−10 | −4.16E−10 |
| K | 0.00E+00 | 0.00E+00 |
| L | 0.00E+00 | 0.00E+00 |
| M | 0.00E+00 | 0.00E+00 |
| N | 0.00E+00 | 0.00E+00 |

The detailed optical data and design parameters of a fourth example are shown in Table 7 and Table 8 below.

TABLE 7

| surface | radius (mm) | thickness (mm) | refractive index | Abbe number |
|---|---|---|---|---|
| S1 (lens L1) | 257.48 | 1.50 | 1.52 | 64.1 |
| S2 (lens L1) | 21.50 | Wide: 35.22 Tele: 30.52 | | |
| S3 (lens L2) | 34.22 | 5.28 | 1.62 | 63.3 |
| S4 (lens L2) | −67.08 | 3.75 | | |
| S5 (lens L3) | 17.47 | 4.60 | 1.6 | 60.6 |
| S6 (stop) | 533.56 | 3.45 | | |
| S7 (lens L4) | −21.79 | 0.60 | 1.7 | 30.1 |
| S8 (lens L4) | 17.76 | 2.40 | | |
| S9 (lens L5) | 168.83 | 4.00 | 1.58 | 59.2 |
| S10 (lens L5) | −15.84 | Wide: 22.35 Tele: 23.66 | | |

TABLE 8

| | Lens surface | |
|---|---|---|
| | S9 | S10 |
| Conic constant | 0.00E+00 | 0.00E+00 |
| A | 0.00E+00 | 0.00E+00 |
| B | 0.00E+00 | 0.00E+00 |
| C | 0.00E+00 | 0.00E+00 |
| D | 1.10E−04 | 8.94E−05 |
| E | 0.00E+00 | 0.00E+00 |
| F | 1.05E−06 | 1.99E−06 |
| G | 0.00E+00 | 0.00E+00 |
| H | 3.84E−08 | −1.81E−08 |
| I | 0.00E+00 | 0.00E+00 |
| J | −1.21E−10 | 8.00E−10 |

TABLE 8-continued

| | Lens surface | |
| --- | --- | --- |
| | S9 | S10 |
| K | 0.00E+00 | 0.00E+00 |
| L | 0.00E+00 | 0.00E+00 |
| M | 0.00E+00 | 0.00E+00 |
| N | 0.00E+00 | 0.00E+00 |

Figure 2:
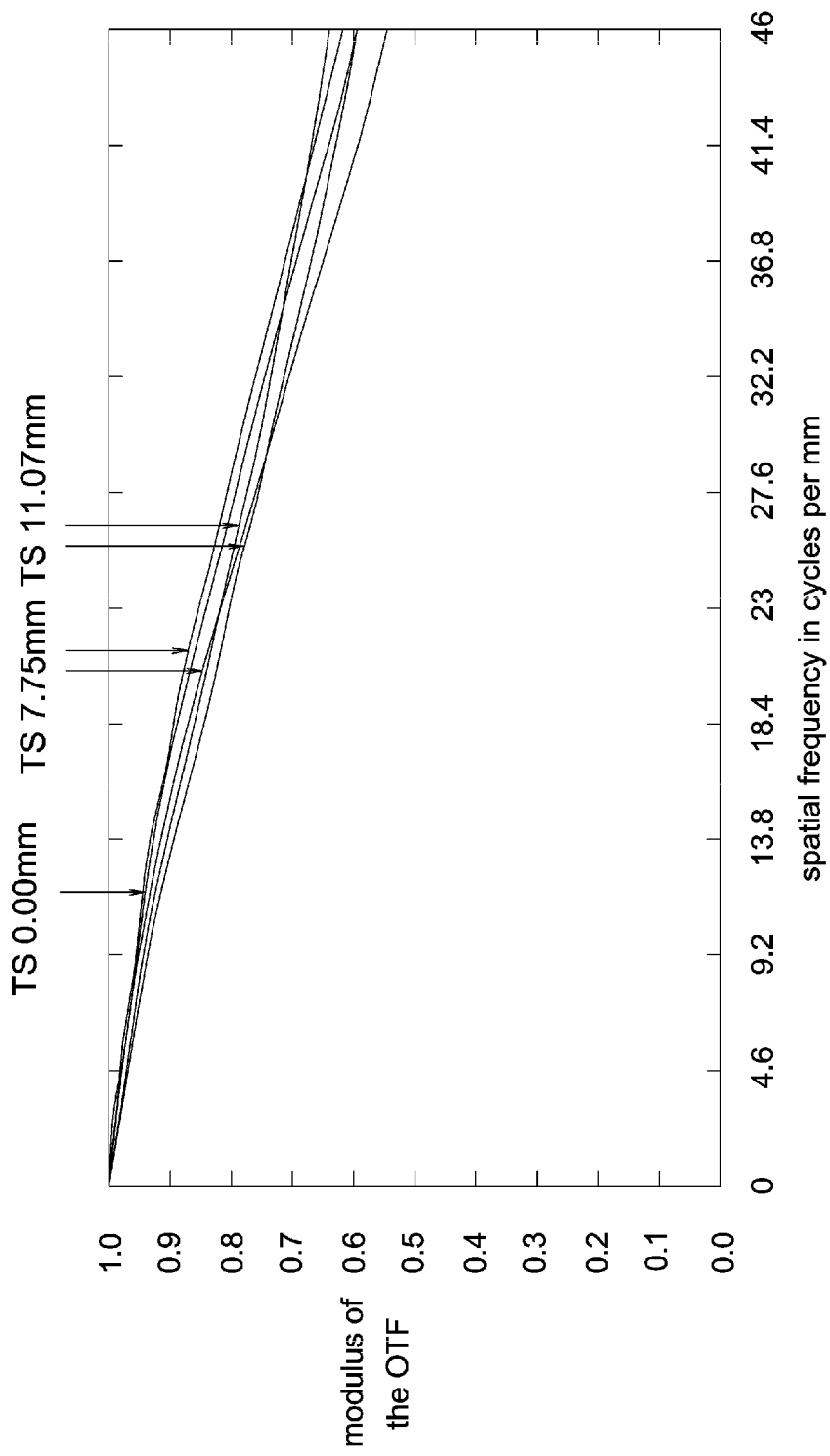
FIGS. 2-6 show optical simulation results of a zoom lens system in the wide angle mode of operation according to an embodiment of the invention.
Figures 3, 4:
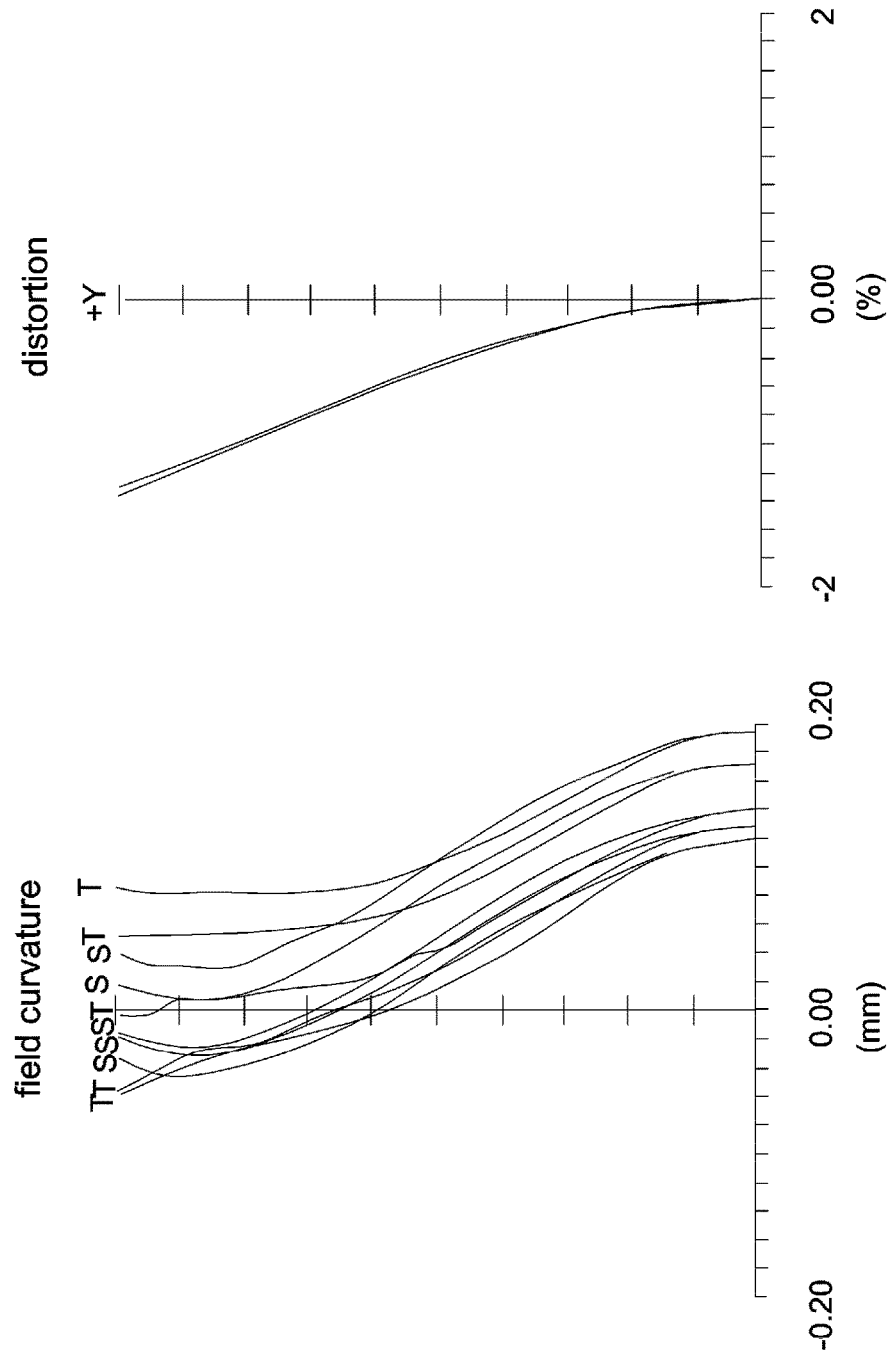
Figure 5:
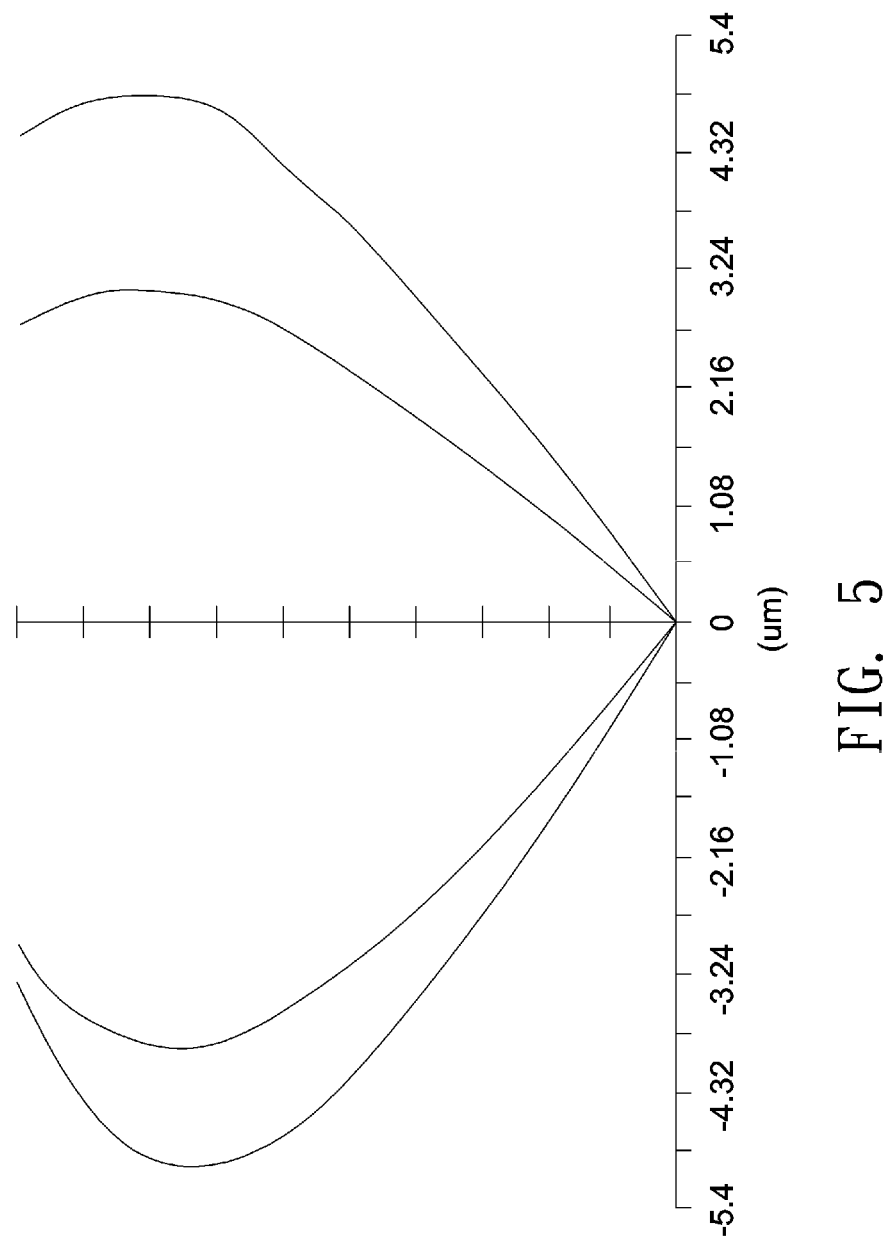
Figure 6:
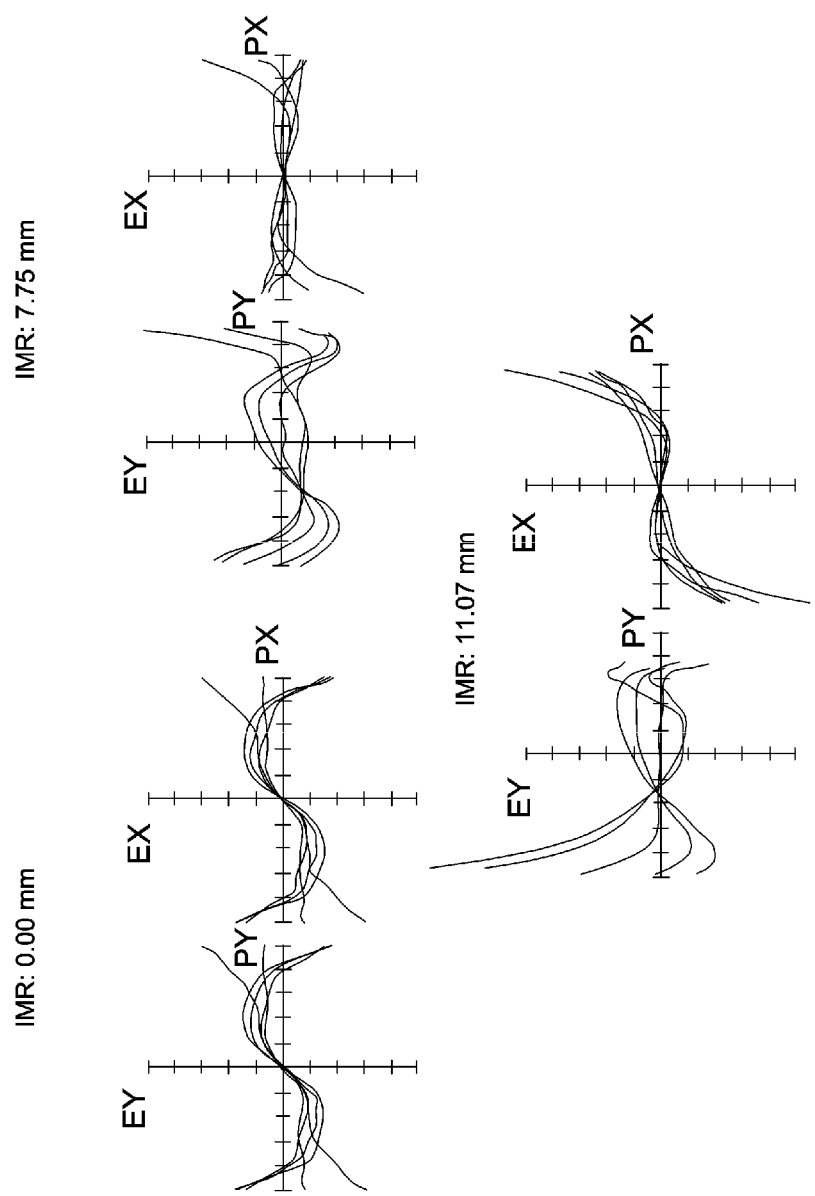

FIGS. 2-6 show optical simulation results of a zoom lens system in the wide angle mode of operation according to an embodiment of the invention. FIG. 2 illustrates modulation transfer function (MTF) curves, FIG. 3 illustrates astigmatic field curves, and FIG. 4 illustrates percentage distortion curves. FIG. 5 illustrates lateral color curves, and FIG. 6 illustrates transverse ray fan plots. As shown in FIGS. 2-6, the simulated results of the MTF, the field curvature and the distortion, the later color and the transverse ray fan plot are within the permitted range specified by the standard, which indicates the zoom lens system according to the above embodiments has good imaging quality.

Figure 7:
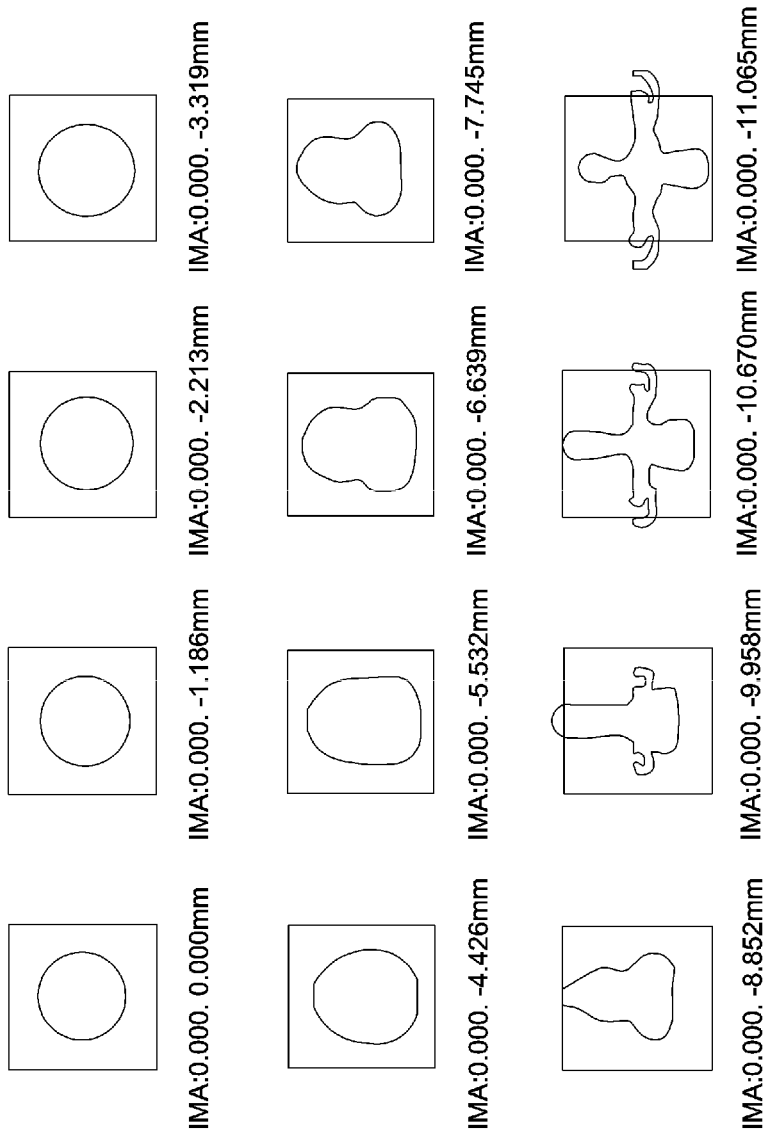
FIG. 7 shows diagrams illustrating light spots rendered on a digital micro-mirror device according to an embodiment of the invention.

FIG. 7 shows diagrams illustrating light spots rendered on a digital micro-mirror device according to an embodiment of the invention. As shown in FIG. 7, in this embodiment, an geometric spot radius for each of the twelve field points may be reduced to smaller than 20 μm (note each reference rectangle box in FIG. 7 has a width of 30 μm), where the geometric spot radius may be defined as a distance from a reference point (the chief ray at the primary wavelength or the middle of the spot cluster) to the ray farthest away from the reference point. In other words, the geometric spot radius is the radius of the circle centered at the reference point which encloses all the rays. Therefore, by the use of the zoom lens system according to the above embodiments, the size of light spots in different fields can be reduced to improve image quality.

Note the parameters listed in Tables 1-8 are only for exemplified purposes but do not limit the invention. It should be appreciated that variations about the design parameters or setting may be made in the embodiments by persons skilled in the art without departing from the scope of the invention. Therefore, any zoom lens system of the same structure is considered to be within the scope of the present disclosure even if it uses different data. The embodiments depicted above and the appended drawings are exemplary and are not intended to limit the scope of the present disclosure.

What is claimed is:

1. A zoom lens system, comprising:
a first lens group of negative refractive power comprising a first lens of negative refractive power; and
a second lens group of positive refractive power disposed between the first lens group and a reduced side and comprising in order from an magnified side to the reduced side a second lens of positive refractive power, a third lens of positive refractive power, a fourth lens of negative refractive power, and a fifth lens of positive refractive power, wherein at least one of the first lens, the second lens, the third lens, the fourth lens and the fifth lens is an aspherical lens having at least one aspherical surface, wherein the condition:
Exp<−33 mm is satisfied at any zoom position, where Exp denotes an exit pupil position with respect to a reduced-side paraxial image plane.

2. The zoom lens system as claimed in claim 1, wherein the condition:
Bf>23 mm is satisfied, where Bf denotes a back focal length measured from a reduced-side surface of the fifth lens to a reduced-side paraxial image plane.

3. The zoom lens system as claimed in claim 1, wherein an aperture stop is located between the third lens and the fourth lens.

4. The zoom lens system as claimed in claim 1, wherein an Abbe number of the fourth lens is in the range of 20-50.

5. The zoom lens system as claimed in claim 1, wherein the fifth lens is an aspherical lens.

6. The zoom lens system as claimed in claim 5, wherein an effective focal length of the fifth lens is larger than 20 mm.

7. The zoom lens system as claimed in claim 1, wherein the aspherical lens is a glass mold lens or a plastic lens.

8. The zoom lens system as claimed in claim 1, wherein the first lens has a concave reduced-side surface, the second lens has a convex magnified-side surface and a convex reduced-side surface, the third lens has a convex magnified-side surface and a concave reduced-side surface, the fourth lens has a concave magnified-side surface and a concave reduced-side surface, and the fifth lens has a convex magnified-side surface and a convex reduced-side surface.

9. The zoom lens system as claimed in claim 1, wherein a geometric spot radius for each field point rendered on a reduced-side paraxial image plane is smaller than 20 μm.

10. A zoom lens system, comprising:
a first lens group of negative refractive power comprising a first lens of negative refractive power; and
a second lens group of positive refractive power disposed adjacent to the first lens group and comprising a second lens, a third lens, a fourth lens and a fifth lens, wherein at least one of the first lens, the second lens, the third lens, the fourth lens and the fifth lens is an aspherical lens having at least one aspherical surface, and the conditions:
Exp<−33 mm; and
Bf>23 mm are satisfied, where Exp denotes an exit pupil position with respect to a reduced-side paraxial image plane and Bf denotes a back focal length measured from a reduced-side surface of the fifth lens to the reduced-side paraxial image plane.

11. The zoom lens system as claimed in claim 10, wherein an aperture stop is located between the third lens and the fourth lens.

12. The zoom lens system as claimed in claim 10, wherein an Abbe number of the fourth lens is in the range of 20-50.

13. The zoom lens system as claimed in claim 10, wherein the fifth lens is an aspherical lens.

14. The zoom lens system as claimed in claim 13, wherein an effective focal length of the fifth lens is larger than 20 mm.

15. The zoom lens system as claimed in claim 10, wherein the aspherical lens is a glass mold lens or a plastic lens.

16. The zoom lens system as claimed in claim 10, wherein the first lens has a concave reduced-side surface, the second lens has a convex magnified-side surface and a convex reduced-side surface, the third lens has a convex magnified-side surface and a concave reduced-side surface, the fourth lens has a concave magnified-side surface and a concave reduced-side surface, and the fifth lens has a convex magnified-side surface and a convex reduced-side surface.

17. The zoom lens system as claimed in claim 10, wherein a geometric spot radius for each field point rendered on a reduced-side paraxial image plane is smaller than 20 μm.

18. A zoom lens system, comprising:
a first lens group of negative refractive power comprising a first lens of negative refractive power; and
a second lens group of positive refractive power disposed between the first lens group and a reduced side and comprising in order from an magnified side to the reduced side a second lens with refractive power, a third lens with refractive power, a fourth lens with refractive power, and a fifth lens with refractive power, wherein a total number of the lenses in the zoom lens system is five, the fifth lens is an aspherical lens having at least one aspherical surface, and the condition:
$Exp < -33$ mm is satisfied, where Exp denotes an exit pupil position with respect to a reduced-side paraxial image plane.

19. The zoom lens system as claimed in claim 18, wherein the condition:
$Bf > 23$ mm is satisfied, where Bf denotes a back focal length measured from a reduced-side surface of the fifth lens to a reduced-side paraxial image plane.

* * * * *